Nov. 27, 1928.

J. H. ROBERTS 1,692,997

SAW DRESSING DEVICE

Filed Oct. 27, 1925  2 Sheets-Sheet 1

Inventor:
James H. Roberts
by Geisler+Ramsey
Attys

Nov. 27, 1928.

J. H. ROBERTS 1,692,997

SAW DRESSING DEVICE

Filed Oct. 27, 1925   2 Sheets-Sheet 2

Inventor:
James H. Roberts
by Geisler & Ramsey
Attys

Patented Nov. 27, 1928.

1,692,997

UNITED STATES PATENT OFFICE.

JAMES H. ROBERTS, OF ST. HELENS, OREGON.

SAW-DRESSING DEVICE.

Application filed October 27, 1925. Serial No. 65,144.

My invention relates to grinding devices, and especially to that type of grinding device used for dressing the brazed connections in an endless band saw and is especially adapted for dressing the brazed connections in a band saw of substantial width such, for example, as the saws used in the "head rigs" of a saw-mill. Inasmuch as the band saws of this character are subject to tremendous forces the connections must be dressed very closely so that the portions of the saw which are thus brazed together will not present shoulders which would "catch up" on the timbers being sawed and tend to break the saw.

Heretofore grinding devices adapted for dressing band saws have not been generally accepted by saw filers for the reason that the grinding head could not be adjusted so closely that hand filing could be eliminated. The uses of grinding devices for performing this dressing operation have thus been limited to the removing of the bulk of the excess brazing material, and finishing has been accomplished by hand filing.

I have discovered that the reason said devices have been impractical except in connection with additional hand filing, is that grinding heads having peripheral grinding surfaces have been used exclusively. Circular grinding heads having peripheral grinding surfaces tend to cut unevenly because of unequal balance as well as irregular grinding surfaces. Thus, if a disk-type grinder head is used for dressing a brazed connection, any portion of the grinding surface which is out of round will cause the grinding action to be applied unevenly to the connection. In practice, even though the grinding head is dressed originally so that it is truly circular, it will become out of round when used because of difference in degrees of hardness in its grinding surface, which causes said surface to wear unevenly. The hard spots in said grinder head also cause said head to be out of rotary balance and thus when said head is rotated at operating speed said heavier portions being affected by centrifugal force causes the grinder shaft to be sprung slightly.

In practice the endless band saws are coiled about the two stages of a saw filer's work bench and thus to dress both sides of a brazed joint, it is necessary to move said joint from one stage to the other and to have two grinders, one on each stage, or else to provide a grinder which is readily removable.

The principal object of my invention is to provide a saw dressing machine which will grind the brazed surfaces of a band saw so efficiently and accurately that no further dressing by manual means will be required and to provide a saw dressing machine so constructed that the surfaces of the band saw will be ground uniformly and evenly to avoid weakening the brazed connection.

A further object of my invention is to provide a saw dressing machine equipped with guides and supports which will not interfere with the operation of the grinder head.

A further object is to provide a saw dressing machine adapted to be easily and quickly moved from one of the stages of a saw filer's bench to the other.

A further object of my invention is to provide a saw dressing machine provided with both vertical and lateral adjusting means, and with auxiliary adjusting means for holding the cutting surface of the grinder head always at the correct angle with the surface of the saw blade.

A still further object of my invention is to provide a saw dressing machine simple in construction and operation and economical of manufacture.

I attain these and other incidental objects in a saw dressing machine comprising an articulated arm pivoted at one end on a flat base, and adjustable to arrange the free end of the arm substantially parallel with the surface to be ground and an operating handle pivoted for vertical movement in the free end of said arm, and a motor driven grinding disc carried thereby.

Said grinding disc is provided with a circular beveled grinding face and rotates on an axis oblique with the surface to be ground, whereby said grinding face is disposed parallel with said surface.

The free end of said arm also is provided with adjustable guides at each side of the grinding disc, to limit the depth of cut made by the latter, and with means normally holding the grinding disc from the work.

The further details of my invention are hereinafter described with reference to the accompanying drawings, in which.

Figure 1:
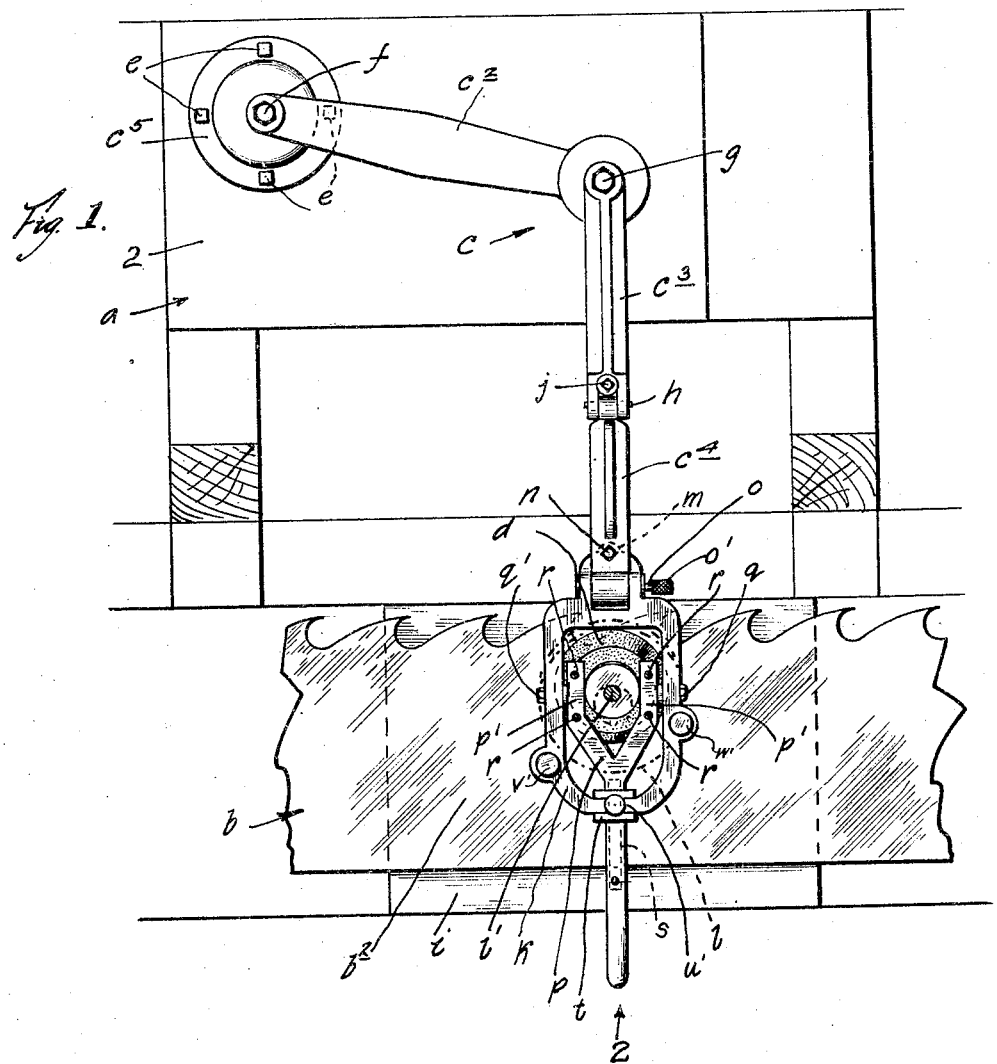
Fig. 1 is a plan view of my dressing devices carried by one of the stages of a saw filer's bench, and shows said devices arranged in a position for dressing one face of a band saw, a portion of the latter being shown.
Figure 2:
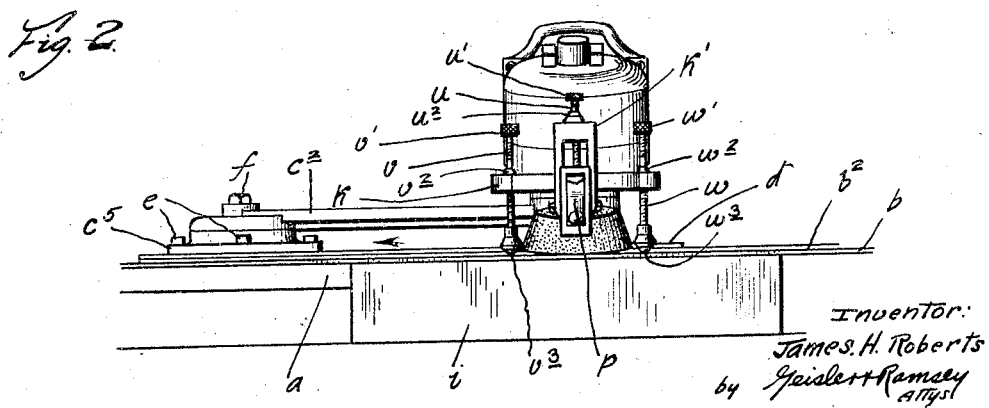
Fig. 2 is an elevation of said devices as viewed in the direction of the arrow 2 in Fig. 1.
Figure 3:
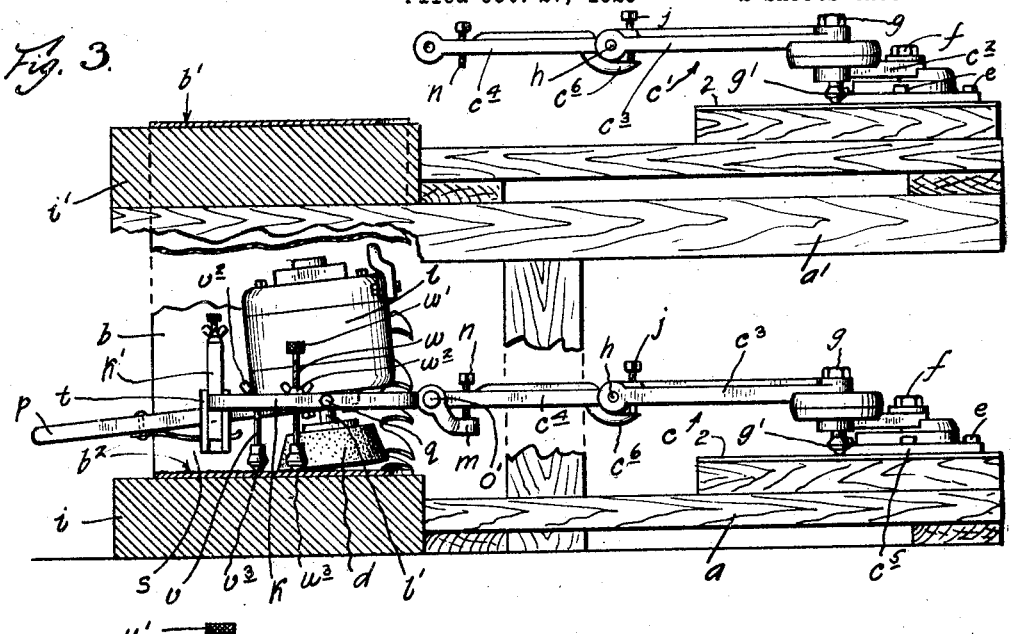
Fig. 3 is a vertical section through both stages of a saw filer's bench, showing the grinding element in position on the inside of the saw blade on the lower stage and a support therefor in position upon the upper stage, the grinding element being shown detached from the latter.

My improved saw dressing device is adapted to be arranged to operate on both stages $a$ and $a'$ of a saw filer's bench. The band saw to be dressed is coiled around said bench so that the outer surface $b'$ of the band saw $b$ can be dressed upon the upper stage $a'$ of said bench and the inner surface $b^2$, upon the lower stage $a$ of said bench.

I preferably provide two mountings or supports $c$ and $c'$ for the grinding head $d$ and make the mountings for said grinding head readily attachable to either of said mountings $c$ or $c'$. In this manner I am able to dress either the inner or outer surfaces of the band saw with one grinding device. Inasmuch as the mountings $c$ and $c'$ are identical, I will describe only the mounting $c$ and will letter the corresponding parts of the mounting $c'$ with identical reference characters.

The mounting $c$ comprises an articulate arm composed of three sections $c^2$, $c^3$ and $c^4$. The section $c^2$ is pivotally connected to a base $c^5$ fastened to a guide surface 2 upon the surface of the bench $a$, said base being preferably fastened very securely to said bench by studs $e$. One end of said connection between the section $c^2$ and the base $c^5$, is made through a pivot bolt $f$. The opposite or free end of said section $c^2$ is connected to the section $c^3$ by a vertical pivot bolt $g$, and the sections $c^3$ and $c^4$ are connected together by a horizontally arranged pivot bolt $h$.

Said pivot bolt $g$ is preferably provided with a bearing member $g'$ which is adapted to bear upon the surface 2. Said surface 2 is preferably arranged to extend substantially parallel to the anvil $i$ upon which the saw is dressed and is preferably made of a metal plate so that the maintenance of parallelism is assured, and to provide a smooth bearing surface for the supporting element $g'$.

The pivotal joint about the pin $g$ between the sections $c^2$ and $c^3$ comprises very large bearing surfaces so that the arm will support a relatively large load without disturbing the parallelism of said section $c^2$ on the surface 2.

The end of said section $c^4$ which is connected to the section $c^3$ by the pin $h$, is provided with a shoulder $c^6$ which is engaged by an adjusting screw $j$ carried by the section $c^3$. Said screw $j$ and said shoulder $c^6$ provide an adjusting means for controlling the angular relationship of said section $c^3$ and $c^4$ in a vertical plane.

A frame $k$ is connected to the arm section $c^4$ by a removable pin $o$, provided with a head $o'$ and is adapted for relative vertical movement to the arm section $c^4$, and the frame $k$ is also provided with a shoulder $m$ underneath the pin $o$, on which a set screw $n$ threaded into the section $c^4$ bears and thus provides vertical adjustment of the frame $k$.

A Y-shaped operating handle $p$ is mounted on the frame $k$ on trunnions $q$ and $q'$ and an electric motor $l$ is fixed between the bifurcated ends $p'$ of the handle $p$ by bolts $r$.

The frame $k$ is provided with a vertical housing $k'$ through which the operating handle extends and a set screw $u$ is provided in the top of the housing and which is rotatably mounted in a boxing $t$ slidable in the housing $k$, which holds the operating handle and provides means for holding the operating handle lifted from the work, and the set screw $u$ is provided with a head $u'$ and a lock nut $u^2$.

A spring $s$ bears against a lug $p^2$ provided on the underside of the portion of the handle contained in the housing $k'$ and thus holds the operating handle lifted from the surface of the saw.

A circular grinding disc $d$ is provided on the shaft $l'$ of the motor $l$ and the cutting face of said grinding disc is formed at a slight bevel with the axis of the shaft $l'$. I also provide two adjustable guides $v$ and $w$ mounted in opposite sides of the frame $k$. Said guides are provided with knurled heads $v'$ and $w'$, respectively, each of which are locked in set position by thumb nuts $v^2$ and $w^2$. The ends of said guides are adapted to bear on the saw blade, and to provide guiding means in a horizontal plane and are provided with anti-friction rollers $v^3$ and $w^3$ so that said frame may be shifted across said saw blade with minimum effort.

The above mentioned guides $v$ and $w$ are spaced apart relatively to the grinding disc sufficiently to always clear the brazed portion of the saw blade and rest on the smooth unbrazed portion of the blade, thus preventing the grinding disc from cutting the brazed portion of the blade, below the plane of the finished surface of the blade.

Furthermore, the guides $v$ and $w$ are offset in the frame $k$ so that when the grinder head is operating near the edge of the saw blade, one of the two guides will rest on the blade, the supporting arm being sufficiently rigid to support the saw dressing machine.

The operation of my device is as follows: When the operator has placed the coiled band saw $b$ over both stages $a$ and $a'$ of his bench and arranged the brazed connection to be dressed upon either the anvil $i$ or the anvil $i'$, he then connects the grinder head to the articulated armlike support $c$ or $c'$ as the case may be. The arm is then extended outwardly so that the posts $v$ and $w$ bear upon the saw blade and straddle the brazed connection. The horizontal plane of the arm is then adjusted so that the frame $k$ extends exactly parallel to the saw blade $b$. This adjustment is made by means of the adjustable screws $j$ and $n$. Thus, if it is necessary in attaining parallelism of the frame $k$ with the saw blade $b$ to move said frame out of the horizontal plane in which the sections $c^2$ and $c^3$ extend, it is possible to adjust said section $c^4$ by extending or retracting said screws.

By this construction, I am able to obtain a considerable degree of accuracy in adjusting the grinder head relatively to the surface of the saw blade. Adjustments to within 1/1000 of an inch being necessary in this work, since the band saws are operated at a very high speed and any slight inequality in the brazed connection is liable to interfere as it is drawn through the cut in the timber.

Figure 4:
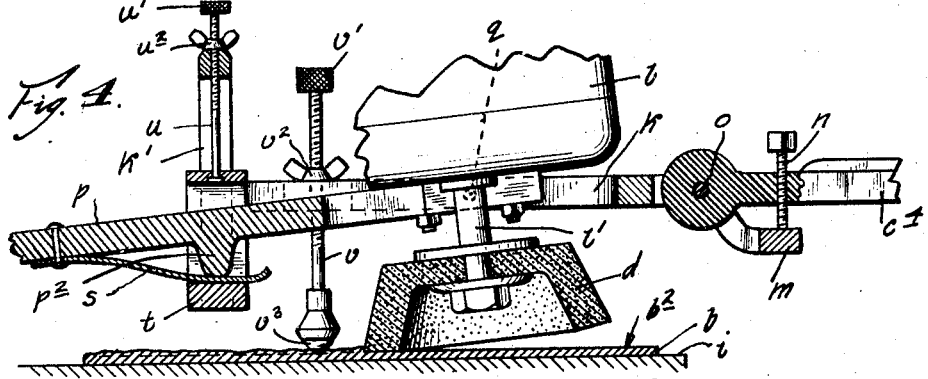
Fig. 4 is an enlarged elevation showing the grinding element and a portion of the prime mover therefor, said figure also showing diagrammatically a section through a band saw.
Figure 5:
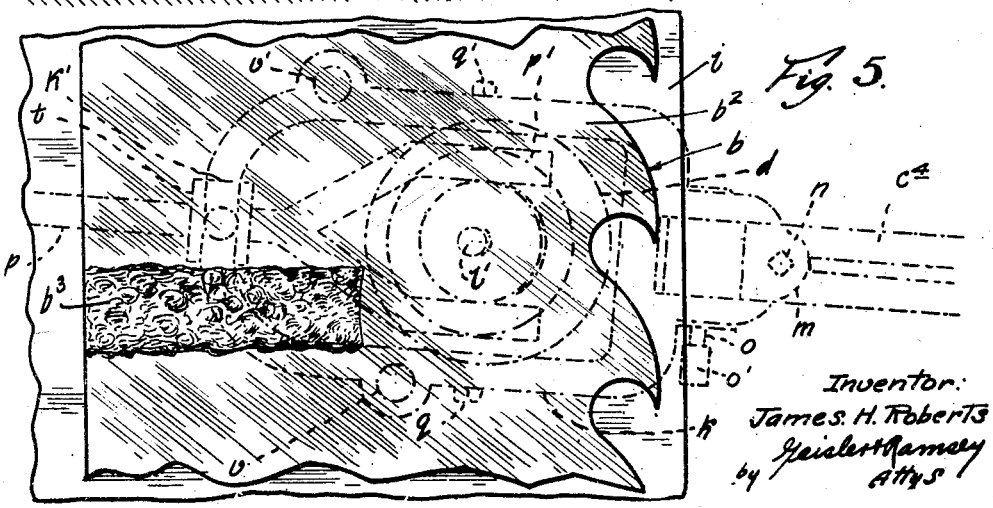
Fig. 5 is a plan view of Fig. 4, showing a fragmentary view of the saw blade and showing in dotted lines the position of my saw dressing device.

The grinding disc $d$ is adjusted by the operating handle to bear on the saw blade and since the cutting face is formed at a slight bevel with the axis of the grinding disc, only a portion of the cutting face bears against the saw blade, as illustrated in Fig. 4.

The spring $s$ holds the grinding disc normally raised from the surface of the work, the operator depressing the operating handle to bring the cutting face of the disc in contact with the surface of the work thereby requiring the operator to hold the grinding disc against the saw and preventing the grinding operation from being done unattended.

All these adjustments are made on the untouched surface of the saw blade and not on the brazed portion so that the lower limit to which the grinding disc can cut will be the plane of the saw surface.

Thus, the grinding disc will cut the saw blade always in the same directions and inequalities in shape and degrees of hardness of the grinding disc will not affect the efficient grinding of the saw blade and the adjusting means I provide make it possible for an unskilled workman to dress the brazed portion of the saw blade without danger of ruining the blade.

I claim:

1. A device of the character described comprising a flat base, an articulated arm pivoted at one end on said base, said arm adjustable to arrange the free end thereof substantially parallel with the surface to be ground, an operating handle pivoted for vertical movement in the free end of said arm, a motor-driven grinding-disc carried by said operating handle, said grinding disc provided with a circular beveled grinding face and rotating on an axis oblique with the surface to be ground whereby said grinding face is disposed parallel with said surface, an adjustable guide provided at the free end of said arm at each side of said grinding disc, thereby to limit the depth of cut made by the latter, and means normally holding said operating arm uplifted.

2. A device of the character described comprising an articulated arm pivoted at one end, said arm adjustable to arrange the free end thereof substantially parallel with the surface to be ground, a motor-driven grinding-disc carried by the free end of said arm, said grinding-disc provided with a circular beveled grinding face and rotating on an axis oblique with the surface to be ground whereby said grinding face is disposed parallel with said surface, and an adjustable guide provided at the free end of said arm, thereby to limit the depth of cut made by the latter.

3. A device of the character described comprising an articulated arm pivoted at one end, means for supporting the pivoted end of the arm in a horizontal plane with the free end of the arm movable in a vertical plane, and means for limiting the movement of said free end toward the work, a motor-driven grinding-disc carried by the free end of said arm, said grinding-disc provided with a circular beveled grinding face and rotating on an axis oblique with the surface to be ground whereby said grinding face is disposed parallel with said surface, and an adjustable guide provided at the free end of said arm, thereby to limit the depth of cut made by the latter.

JAMES H. ROBERTS.